United States Patent [19]

Rogers, Jr.

[11] 3,837,545

[45] Sept. 24, 1974

[54] STRUCTURE FOR SECURITY HOLDING OF A HELMET ON A VEHICLE

[76] Inventor: Leonard O. Rogers, Jr., P.O. Box 117, Norman Park, Ga. 31771

[22] Filed: Jan. 19, 1972

[21] Appl. No.: 219,085

[52] U.S. Cl................... 224/31, 224/32 R, 224/33, 224/39 R, 211/30, 248/203
[51] Int. Cl............................................. B62j 11/00
[58] Field of Search............ 224/32 R, 31, 33 R, 35, 224/37, 38, 39 R, 40, 30 R; 223/25, 24; 248/309, 203; 211/30, 31

[56] References Cited
UNITED STATES PATENTS

| 736,987 | 8/1903 | Manning | 211/30 UX |
|---|---|---|---|
| 1,359,613 | 11/1920 | Miller | 211/31 |
| 2,807,399 | 9/1957 | Burns | 224/45 W |
| 3,399,855 | 9/1968 | Shirai | 280/289 X |
| 3,604,671 | 9/1971 | Walker | 248/309 |

FOREIGN PATENTS OR APPLICATIONS

| 574,368 | 7/1924 | France | 224/30 R |
|---|---|---|---|
| 445,595 | 2/1950 | Italy | 224/30 R |

Primary Examiner—Robert J. Spar
Assistant Examiner—Jerold M. Forsberg
Attorney, Agent, or Firm—Albert L. Carter

[57] ABSTRACT

This invention concerns several embodiments of a structural arrangement on a vehicle by which a riding helmet may be security retained or locked to the vehicle. The structure comprises essentially a vehicle mounted frame with a pair of circularly shaped or curved rod pivotally connected relative to the base of a vehicle mounted frame, or pivotally connected relative to each other in any appropriate manner to the vehicle structure; the curvature or circular shape of the rods being less than the maximum curvature of the helmet exterior. Included is an arrangement whereby the rods are relatively immovable to each other when locked in a position to secure a helmet. Also a security container for valuables may be incorporated with the base portion of the structure so as to locate the open side of such a security container within the interior of a helmet secured to the vehicle through the disclosed structure.

5 Claims, 8 Drawing Figures

STRUCTURE FOR SECURITY HOLDING OF A HELMET ON A VEHICLE

This invention relates to a structural arrangement to be associated with or mounted upon a vehicle such as a motorcycle, motor bike, snowmobile, or the like, by which a rider helmet may be securely retained on the vehicle by locking. For safety reasons, the law in most jurisdictions provide for the requirement of a driver and all riders of certain types of vehicles (i.e., a two-wheeled motor vehicle) to wear head helmets during operation of the vehicle. Once the vehicle is stopped, the problem of theft of the helmet dictates that the rider must carry the helmet with him unless some means is provided to secure the helmet to the vehicle in a security sense. Likewise, without some means for holding or securing a second helmet to the vehicle, the driver is unable to meet or pickup an additional person as a passenger unless such other person happens to have a helmet readily available or with them. Without a security retention means for such second helmet, the same security problems facing the driver are repeated for the second helmet should the vehicle be parked and the driver temporarily leave the vehicle.

Thusly, it is an object of this invention to provide a helmet retention structure that may be mounted on a motor vehicle whereby a helmet may be securely locked to such vehicle.

It is a further object of this invention to provide such a helmet retention structure which may further include a securitylike container for valuables that can be located within the interior of a helmet when the helmet is securely locked in the vehicle mounted structure of this invention.

Another object of this invention is to provide for such a helmet retention structure on a motor vehicle that is of a simple arrangement, of relatively little cost, and which can be mounted to the vehicle without extensive modification thereto.

Other objects and advantages of this invention will become apparent from the following explanation of several embodiments of this invention when taken in conjunction with the accompanying drawings in which.

Generally stated, the structure of this invention comprises a base frame member that may be mounted to, or be formed from, some portion of the vehicle structure; such base frame member having a width sufficient to pass between the ear protection projections of a rider's safety helmet with a pair of circullarly shaped or curved rods that are pivotally connected to the base. The rods are of a configuration that substantially corresponds to the exterior configuration of the helmet, but yet are of a smaller diameter of curvature than the maximum outer curvature of the helmet so that by spacing each of the two rods on opposite sides of the fore and aft centerline of the helmet, the helmet becomes securely retained on the base when the rods become locked relative to each other while encircling opposite sides of the helmet.

Figure 1:
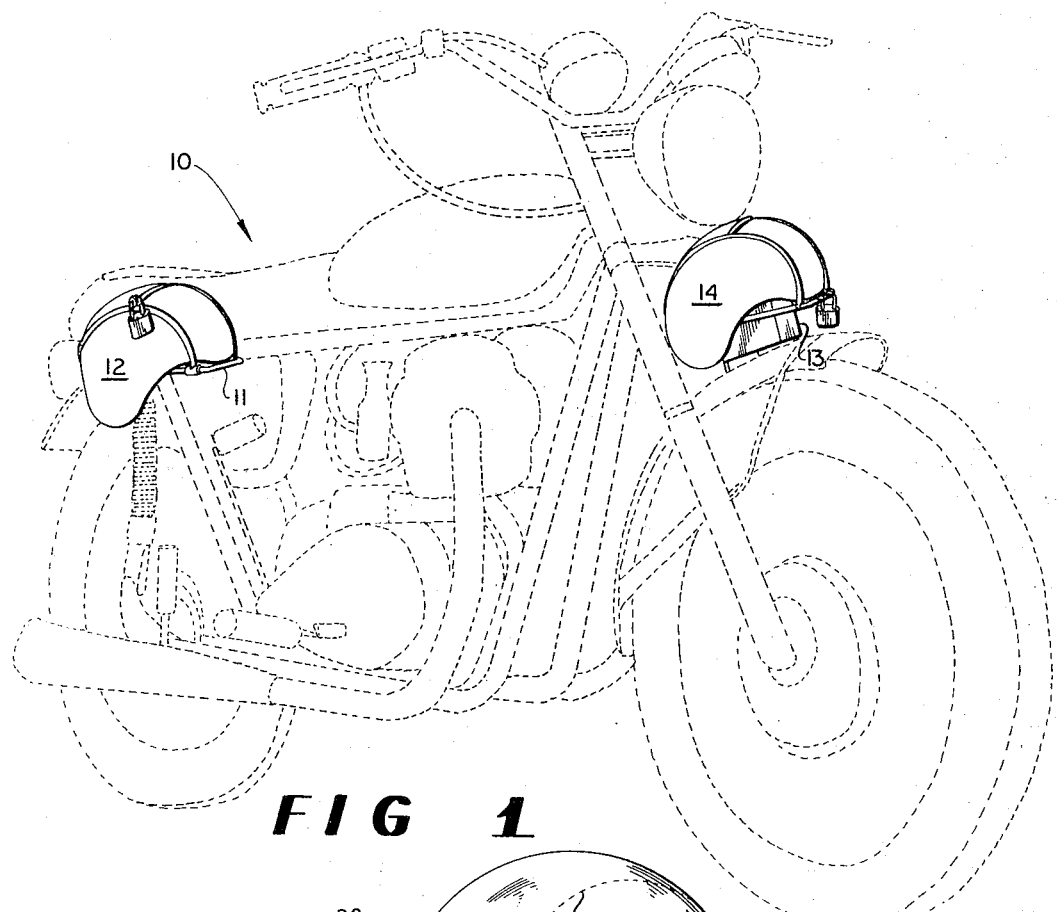
FIG. 1 shows a two-wheeled vehicle depicting two embodiments of the structure of this invention mounted thereon, one embodiment being the foldable, collapsible structure shown in FIGS. 2 and 3, and a second embodiment shown in FIG. 4.

Referring now to FIGS. 1 through 4, there is shown in FIG. 1 a two-wheeled vehicle 10 having a helmet retainer structure 11 containing a helmet 12 mounted on the rear frame of vehicle 10, and another helmet retainer structure 13 of a different embodiment mounted on the front fender of vehicle 10 with a helmet 14 contained thereon.

Figure 2:
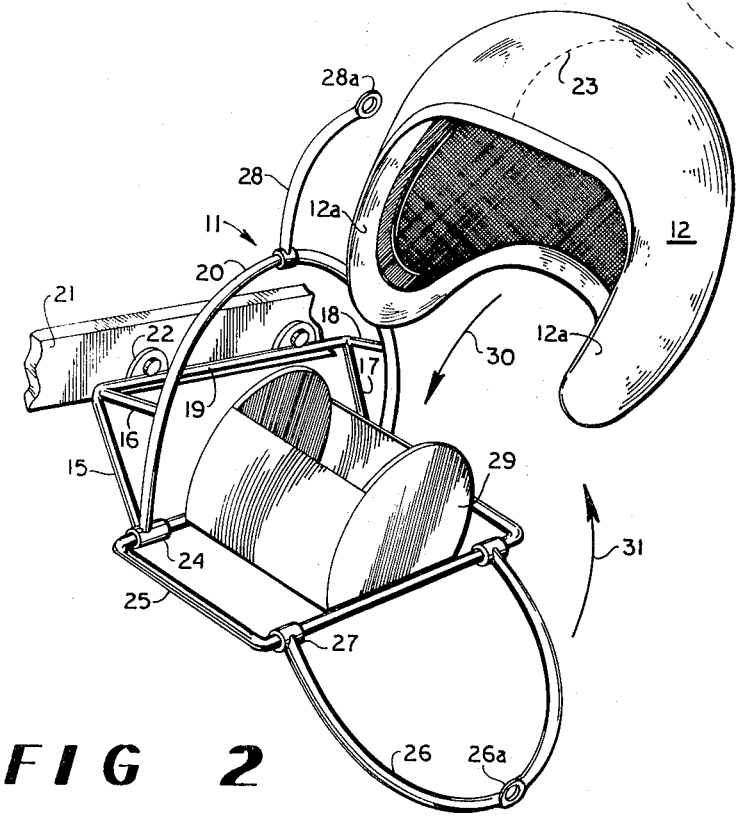
FIG. 2 is a perspective view of one of the embodiments shown in FIG. 1 showing how a helmet may be inserted into the structure for securing therein.
Figure 3:
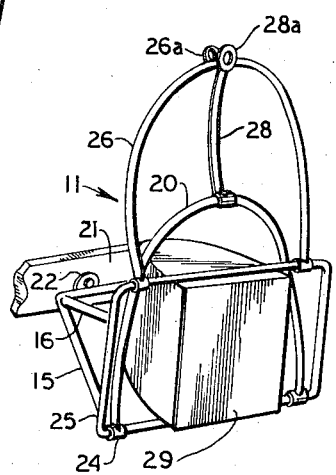
FIG. 3 shows the structure of FIG. 2 in a collapsed or folded condition when no helmet is located therein.

Referring now to FIGS. 2 and 3, the helmet retainer structure 11 includes a rigid frame comprising frame members 15, 16, 17, 18, 19 and helmet rod 20, preferably secured together by welding or any other appropriate means. This frame structure is mounted upon a support or bracket 21, which may be a structural part of the vehicle 10 or a support or mounting means added to the frame of vehicle 10 on which to mount helmet retainer 11; said mounting by use of bolts, rivets, or etc. 22. Helmet rod 20 is curved to substantially correspond to the external surface of helmet 12, but at a radius of curvature less than the maximum radius of curvature of the helmet 12 represented by the dashed line 23; the reason for this limitation on the radius of curvature of the helmet rods being as explained more fully hereinafter. Journaled within bearings 24 rigidly connected to the bases of helmet rod 20 and frame members 15, is a rectangular base 25 formed by a rod; the width of base 25 being less than the interior lateral distance between ear protection projections 12a on helmet 12 as will be explained more fully hereinafter.

Pivotally connected to base 25 is a second helmet rod 26 through bearings 27; the limitation of the radius of curvature for helmet rod 26 being the same as for helmet rod 20 described above. A helmet rod connector 28 is pivotally connected to helmet rod 20 and has an eye or clasp 28a capable of cooperating with a cooresponding eye or clasp 26a on helmet rod 26 to permit securing eyes 26a and 28a together by a padlock or other appropriate lock means. It is also to be noted that helmet rod connector 28 may be arcuately shaped in a longitudinal direction so as to substantially conform to the outer surface of the helmet 12 intermediate the helmet rods 20 and 26 when the helmet 12 is installed in the structure as explained below.

If desired, a security container 29 can be incorporated by mounting or securing, as by welding for example, to the two longitudinal portions of base 25; the overall configuration of container 29 being such that it will fit, by being located within, the interior of the helmet 12 when helmet 12 is installed within the structure 11.

To secure a helmet 12 to the helmet retainer 11, with the structure as shown in FIG. 2, helmet 12 is moved in the direction of arrow 30 so that the ear protection projections 12a of helmet 12 pass through the openings formed by the helmet rods 20 and 26 and the base 25;

the elongate sides of base 25 passing between projections 12a. Helmet 12 then comes to rest by circumferential contact on base 25, whereupon helmet rod 26 is swung upwardly in the direction represented by arrow 31 until the eyes 26a and 28a come into registration and may be locked together by an appropriate lock, such as a padlock. If the option of the security container 29 is utilized, it can be seen that container 29 is then located within helmet 12 and with the appropriate configuration and location of the opening, nothing can be inserted or removed from container 29 without first removing helmet 12. By having the curvature radius of rods 20 and 26 less than the maximum curvature radius of helmet 12, the rods 20 and 26 are located on opposite sides of the maximum curvature radius 23 of helmet 12, and the secured retainer structure 11 cannot be pivoted around so as to free the helmet once eyes 26a and 28a are locked.

With reference to FIG. 3, retainer structure 11 can be collapsed or folded up by swinging base 25 upwardly around bearings 24 whereby container 29 will move into and through the plane defined by rod 20 by swinging about the axis of bearings 24. By swinging both connector rod 28 and helmet rod 26 upwardly, eyes 26a and 28a come into sufficient proximity so as to permit retainer structure 11 to be secured in a folded or retracted position by use of the padlock passing through both eyes 26a and 28a.

Figure 4:
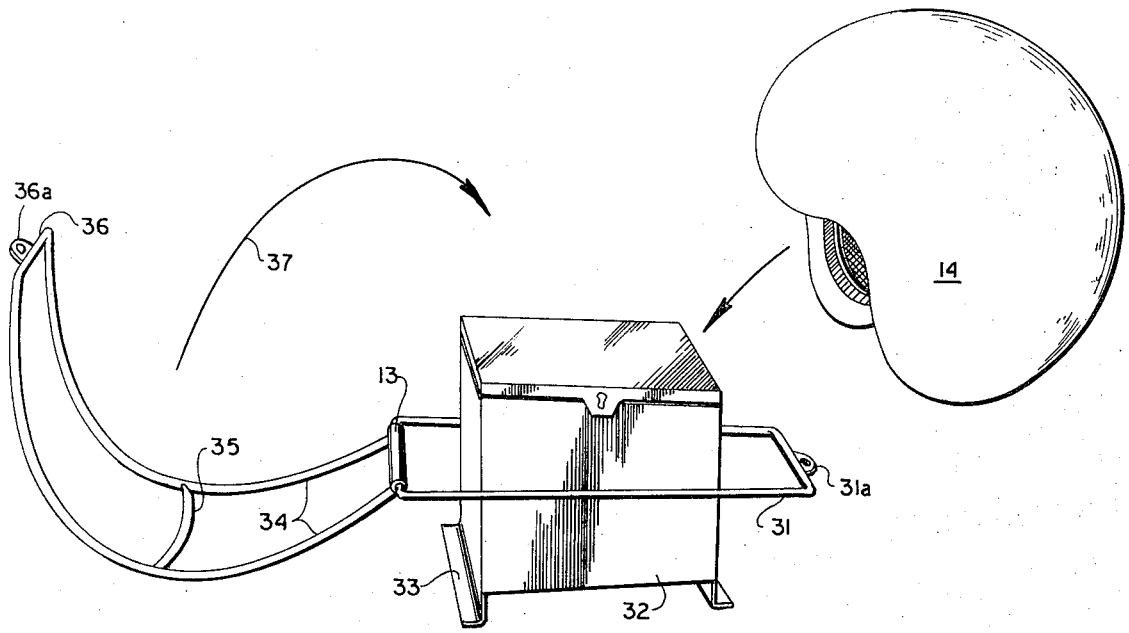
FIG. 4 shows details of the second embodiment shown in FIG. 1.

In FIG. 4 there is shown a slightly different embodiment in that the retainer structure utilizes a base 31 that corresponds to the previous base 25, with base 31 being secured as by welding or other appropriate means, with a security container 32. Container 32 in turn has appropriate mounting means or brackets 33 by which retainer structure 13 may be mounted to a vehicle fender or other desired or appropriate structure. Helmet rods 34 are interconnected by connecting rods 35 and 36; rod 35 being curved or arcuate in the same manner and for the same purpose as connector rod 28 described above. The assembly of helmet rods 34 are pivotally connected to one of the shorter ends of base 31 so that when the helmet rods 34 are swung upwardly in the direction of arrow 37, eyes 31a and 36a come into alignment and hence capable of becoming locked with a padlock as described above.

Security restraint of helmet 14 is accomplished as described above in placement of helmet 14 over container 32 until helmet 14 rests on base 31. The swinging of helmet rods 34 in the direction of arrow 37 until eyes 31a and 36a are in alignment followed by the locking thereof results in helmet 14 being security retained in the same manner as described above in that the distance between helmet rods 34 is such as to place one of the rods on each side of the maximum curvature radius of helmet 14.

Figure 5:
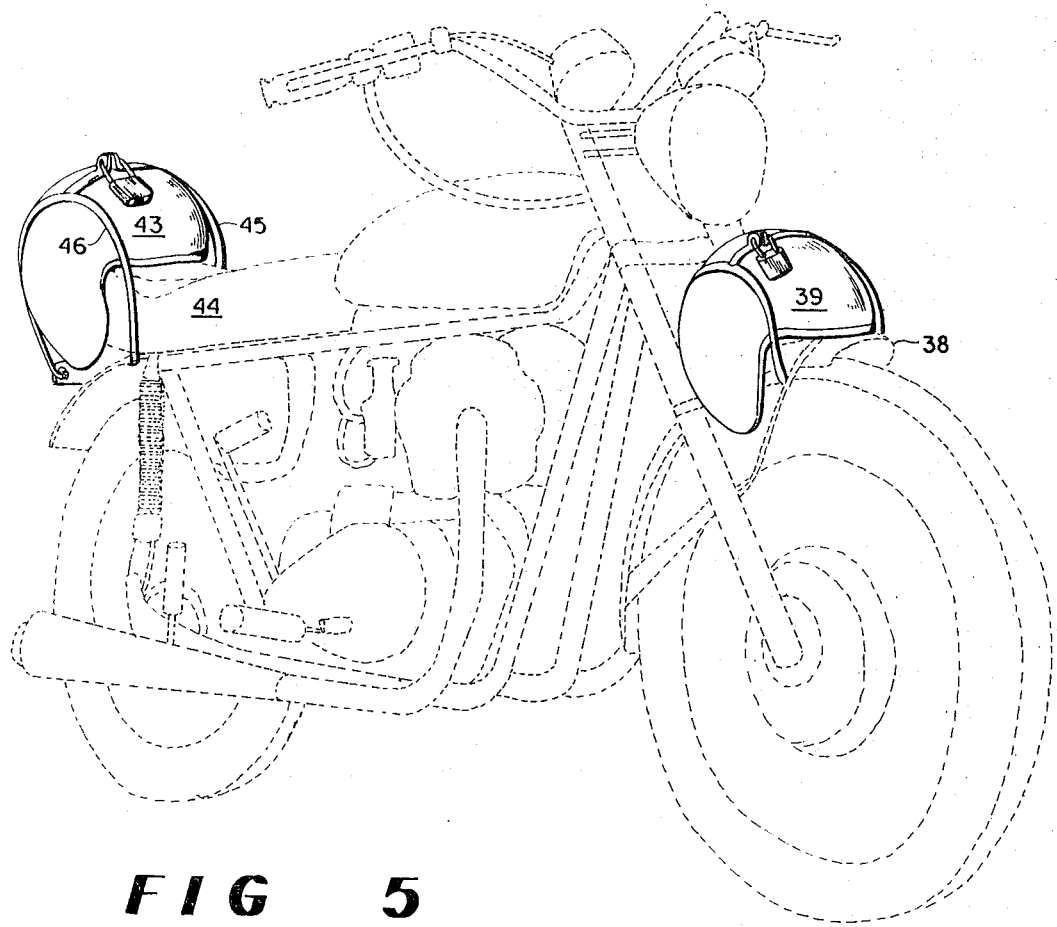
FIG. 5 shows a two-wheeled vehicle with helmet retaining structures of this invention of two further embodiments, one being on the front fender of the vehicle, and the other on the back of the seat or luggage carrier adjacent the tail light.
Figure 6:
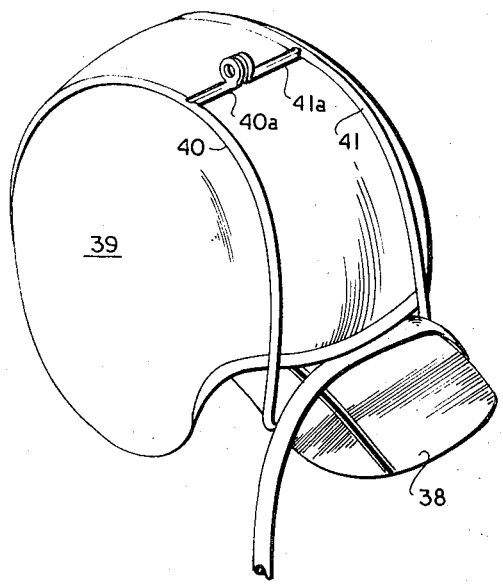
FIGS. 6 and 7 show details of the embodiment shown on the front fender of the vehicle in FIG. 5; and, FIG. 8 shows details of the structure at the rear of the vehicle of FIG. 5 with a helmet in retained position.
Figure 7:
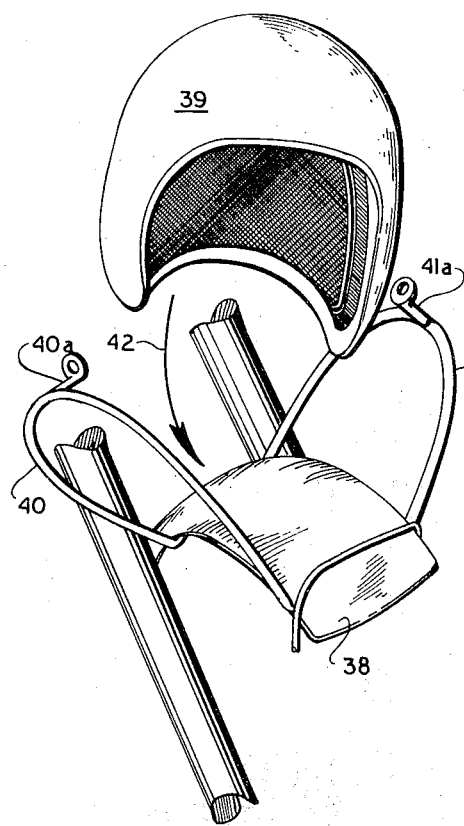

FIGS. 5, 6 and 7 show still a further embodiment of the helmet retainer device of this invention utilizing the front fender 38 of the depicted two-wheeled vehicle for the base to receive helmet 39. Helmet rods 40 and 41 are each pivotally connected to the undersurface of fender 38 by any appropriate manner, and are configured to the external contour of helmet 39 in the same manner and degree discussed above in that they are less than the maximum curvature radius of helmet 39. The locking connection between helmet rods 40 and 41 in this embodiment consists of partial connector units 40a and 41a securely connected to helmet rods 40 and 41 respectively and each with an alignable eye structure at the free ends thereof to permit locking the helmet in a retained position as shown in FIG. 6 after helmet 39 is placed into proper position by movement in the direction of arrow 42 in FIG. 7.

Figure 8:
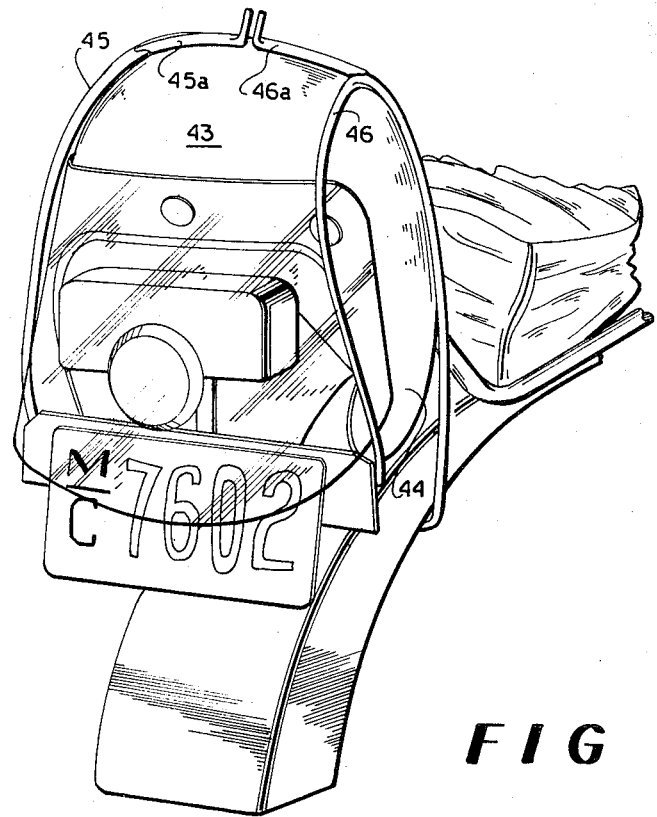

Since by law a rider in most jurisdictions is required to wear a safety helmet whether he is the driver of such certain type vehicles or merely a passenger thereon, the ability of picking up a passenger that may not have such a helmet handy is accomplished by the presence of a second helmet secured in a second helmet retainer device on the vehicle. In FIGS. 5 and 8, such a second arrangement is shown wherein helmet 43 is mounted over the back or trailing end of the vehicle seat or luggage carrying structure 44. In this embodiment, helmet rods 45 and 46 are pivotally secured in any appropriate manner to the undersurface of the rear fender of the vehicle or the luggage carrier or any other appropriate structure. Partial connector units 45a and 46a are secured to helmet rods 45 and 46 respectively with each also having an alignable eye structure at the free end thereof; the eye elements being used for locking purposes.

It is to be recognized that a security container as shown in FIGS. 1 through 4 may be readily incorporated in the helmet retainers shown in FIGS. 5 through 8.

Thusly, there is shown a novel security arrangement to retain a rider helmet to a vehicle whereby the helmet is retainable whether the vehicle is in operation or parked. Also, there is shown an arrangement whereby valuables may likewise be retained in a security container or compartment with free access thereto restricted by the presence of a secured helmet being lockingly retained within the locked security structure.

While particular embodiments of this invention have been shown and described, it will be obvious to those skilled in the art that various changes and modifications may be made without departing from the invention and it is intended to cover all such modifications and equivalents as fall within the true spirit and scope of this invention.

What is claimed is:

1. A structure for mounting to a vehicle for security retention of a rider helmet to the vehicle comprising:

a base means of a width sufficient to fit between the ear protection projection of a helmet when a helmet is placed thereon, and forming a pair of elongated and laterally spaced sides;

a first and a second curved rod means having a radius of curvature less than the maximum longitudinal radius of curvature of a helmet to be retained, each of said curved rod means having a pair of ends with the ends of one curved rod means connected to one side of said base means and the ends of the other curved rod means connected to the other side of said base means whereby each curved rod means and its respective base means side forms an open and unoccupied opening through which may project an ear protection projection and a part of the side portion of a helmet to be retained;

at least one of said curved rod means being pivotally connected to said base means;

and securing means adapted to locate said first and second curved rod means on opposite sides of the longitudinal centerline of a helmet in substantially parallel arcuate relationship to each other, said securing means including a connectable means extending laterally between said first and second curved rod means and intermediate the ends thereof when said first and second curved rod means are placed in said parallel arcuate relationship, said connectable means including a pair of confronting eyelet means, and said securing means further including a security lock means of a padlock engageable with said eyelet means to retain said curved rod means substantially immovable relative to said base means and relative to each other when a helmet is security retained in said structure with said security lock means padlock operationally installed with said eyelet means.

2. A structure as claimed in claim 1 including a security container means secured to said base means, said container means having an opening on one side thereof and at least partially located within the interior of a helmet when the helmet is security retained on said structure.

3. A structure as claimed in claim 1 including a rigid frame means for mounting the structure to a vehicle, said rigid frame means including said first curved rod means, said first curved rod means pivotally connected to said base means, and said second curved rod means also independently pivotally connected to said base means.

4. A structure as claimed in claim 1 wherein said first and second curved rod means are each independently pivotally connected to said base means.

5. A structure as claimed in claim 1 in combination with a vehicle means whereby said structure is mounted on said vehicle means.

* * * * *